US012739690B2

(12) United States Patent
Paterra

(10) Patent No.: US 12,739,690 B2
(45) Date of Patent: Sep. 15, 2026

(54) DYNAMIC SPECTRUM MANAGEMENT FOR PORTABLE RADIO-BASED NETWORKS

(71) Applicant: Amazon Technologies, Inc., Seattle, WA (US)

(72) Inventor: Frank Paterra, Oakton, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 512 days.

(21) Appl. No.: 18/183,921

(22) Filed: Mar. 14, 2023

(65) Prior Publication Data

US 2024/0314619 A1 Sep. 19, 2024

(51) Int. Cl.
*H04W 28/02* (2009.01)
*H04W 64/00* (2009.01)
(Continued)

(52) U.S. Cl.
CPC ..... *H04W 28/0226* (2013.01); *H04W 64/006* (2013.01); *H04W 72/0453* (2013.01); *H04W 72/121* (2013.01)

(58) Field of Classification Search
CPC ........... H04W 28/0226; H04W 64/006; H04W 72/0453; H04W 72/121; H04W 72/51; H04W 88/08; H04W 24/02; H04W 84/12; H04W 12/08; H04W 88/02; H04W 72/23; H04W 24/10; H04W 28/0231; H04W 72/0446; H04W 76/10; H04W 12/062; H04W 48/20; H04W 88/085; H04W 16/28; H04W 72/20; H04W 74/006; H04W 84/18; H04W 4/029; H04W 4/40; H04W 4/44; H04W 92/02; H04W 36/00; H04W 40/246; H04W 76/19; H04W 88/182; H04W 12/61; H04W 12/63; H04W 12/64; H04W 28/0236; H04W 28/0268; H04W 28/0967; H04W 36/0016; H04W 36/08; H04W 72/541; H04W 72/542; H04W 8/24; H04W 84/045; H04B 7/0617; H04B 7/0626; H04B 7/0413; H04B 7/2643; H04B 7/02;
(Continued)

(56) References Cited

U.S. PATENT DOCUMENTS

2008/0159236 A1* 7/2008 Chng .................... H04W 16/16 370/335
2009/0023458 A1 1/2009 Mountney
(Continued)

OTHER PUBLICATIONS

International Search Report and Written Opinion for PCT/US24/19541 mailed Aug. 22, 2024.

*Primary Examiner* — Nimesh Patel
(74) *Attorney, Agent, or Firm* — Perilla Knox & Hildebrandt LLP; Jonathan A. Paulis

(57) ABSTRACT

Disclosed are various embodiments for dynamic spectrum management for portable radio-based networks. In one embodiment, it is determined that a portable radio unit implementing a cell of a radio-based network has moved away from a reference location associated with a first spectrum allocation used by the portable radio unit. A second spectrum allocation for the portable radio unit is obtained based at least in part on a direction of movement of the portable radio unit. The portable radio unit is then configured to use the second spectrum allocation instead of the first spectrum allocation.

18 Claims, 11 Drawing Sheets

(51) Int. Cl.
*H04W 72/0453* (2023.01)
*H04W 72/121* (2023.01)

(58) Field of Classification Search
CPC ...... H04B 7/022; H04B 7/026; H04B 7/0404; H04B 7/0408; H04B 7/0479; H04B 7/0491; H04B 7/0632; H04B 7/0634; H04B 7/0695; H04B 7/0697; H04B 17/309; H04B 7/0452; H04L 41/0894; H04L 41/0895; H04L 43/16; H04L 5/001; H04L 41/064; H04L 41/16; H04L 43/12; H04L 43/0888; H04L 5/0023; H04L 41/0803; H04L 47/781; G06N 20/00; G06N 7/01; G06N 3/045; G06N 3/044; G06N 3/0464; G06N 3/063; G06N 3/08; G06N 3/09
See application file for complete search history.

(56) References Cited

U.S. PATENT DOCUMENTS

2013/0281049 A1* 10/2013 Lee ....................... H04W 24/00
455/405
2015/0237217 A1* 8/2015 Roark ....................... H02J 7/34
248/68.1
2015/0327078 A1* 11/2015 Zhu ....................... H04W 16/28
370/328
2019/0182114 A1* 6/2019 Tavridis .................. H04L 41/16
2023/0045596 A1 2/2023 Mueller

* cited by examiner

Figure 1B:
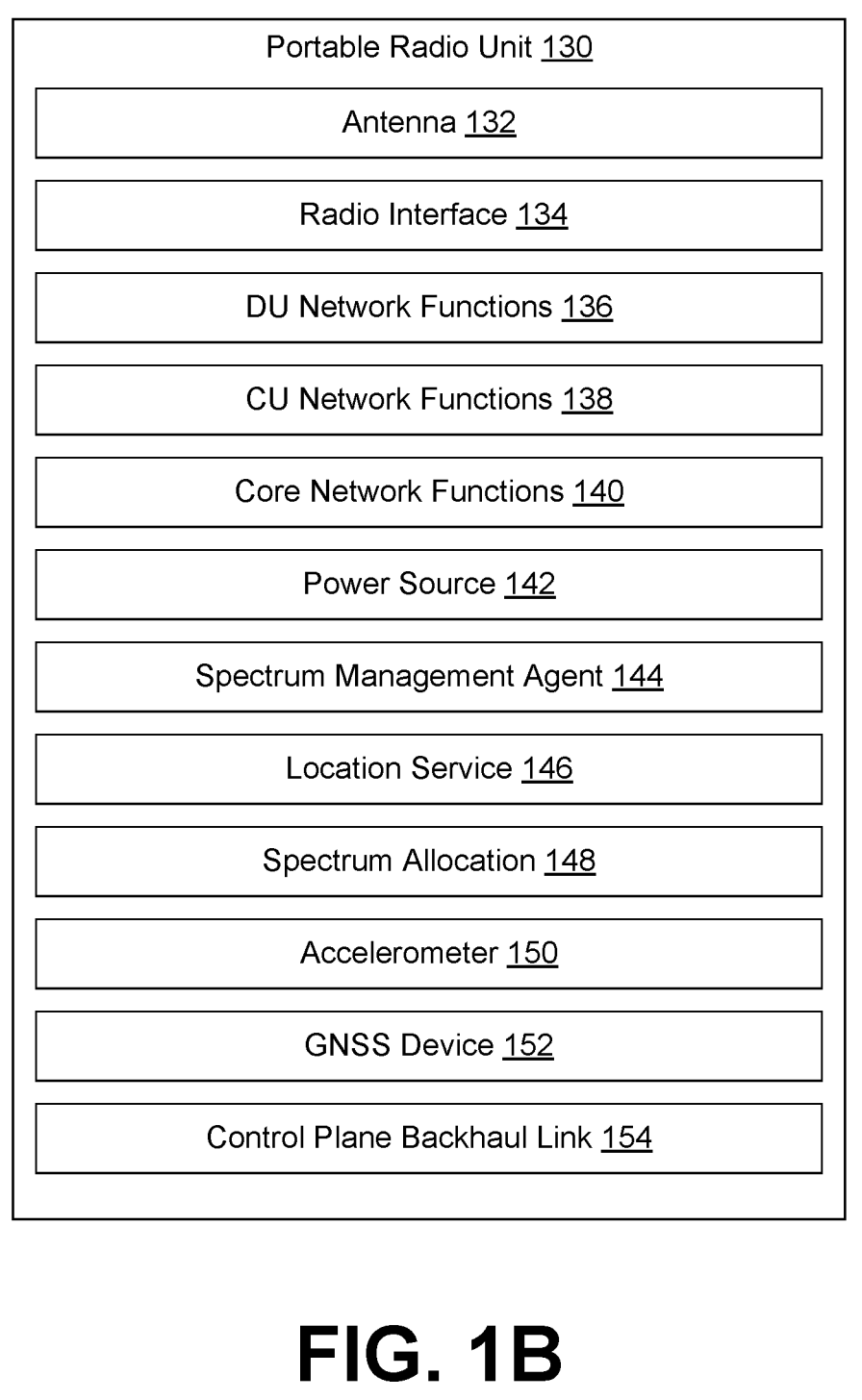

Portable Radio Unit 130

Antenna 132

Radio Interface 134

DU Network Functions 136

CU Network Functions 138

Core Network Functions 140

Power Source 142

Spectrum Management Agent 144

Location Service 146

Spectrum Allocation 148

Accelerometer 150

GNSS Device 152

Control Plane Backhaul Link 154

DYNAMIC SPECTRUM MANAGEMENT FOR PORTABLE RADIO-BASED NETWORKS

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IOT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1B is a block diagram of one example of a portable radio unit according to one or more embodiments of the present disclosure.

DETAILED DESCRIPTION

Figure 1A:
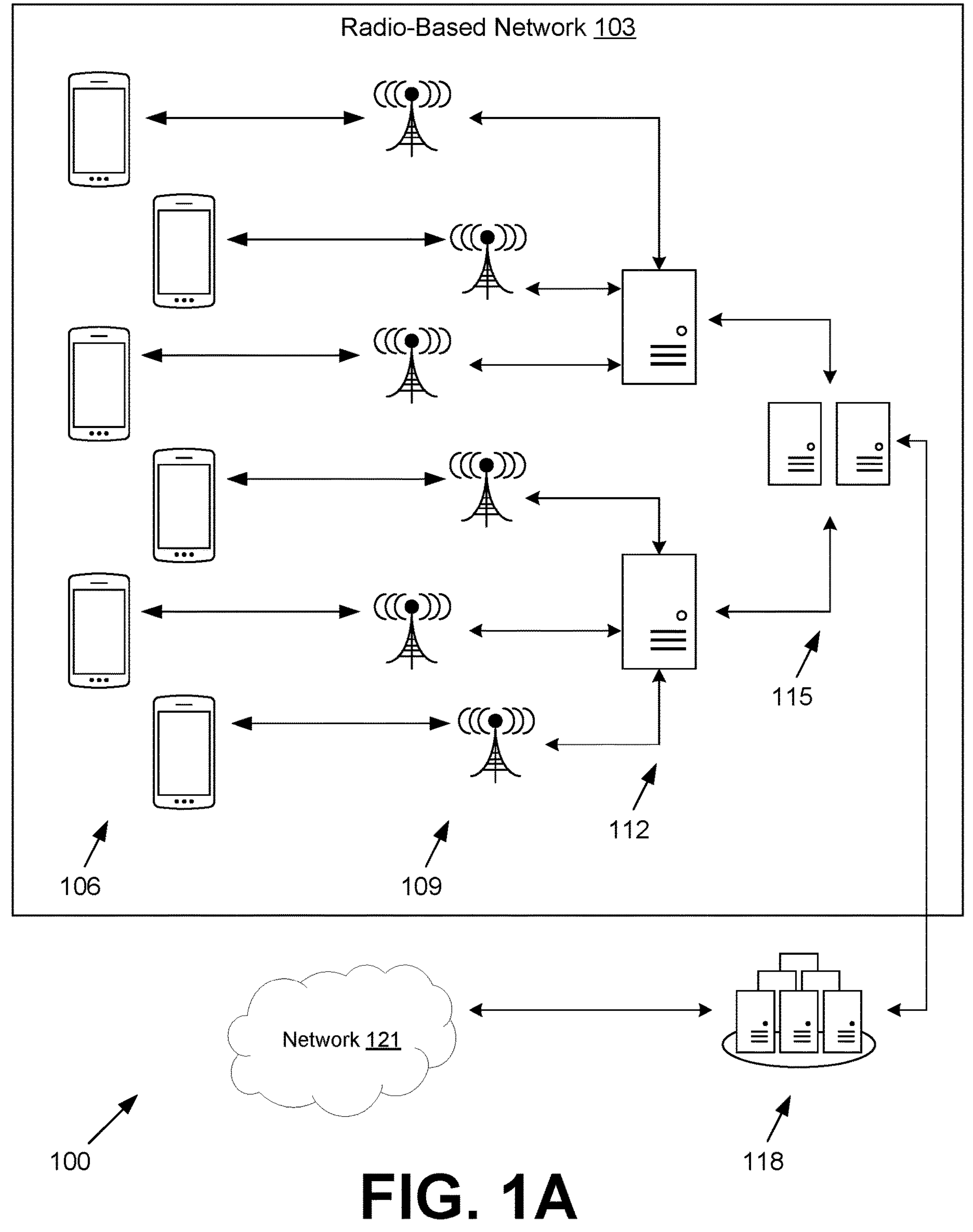
FIG. 1A is a drawing of an example of a communication network that is deployed and managed according to various embodiments of the present disclosure.

The present disclosure relates to dynamic spectrum management for portable radio-based networks. Radio-based networks, such as a fourth-generation (4G) Long-Term Evolution (LTE) network, a fifth-generation (5G) network, a 4G-5G hybrid core with both 4G and 5G RANs, a sixth-generation (6G) network, and so forth, are designed around a set of radio units, such as base stations or access points, or cell sites that provide coverage to user equipment (UE) in a geographic area. Traditionally, while UE can be mobile, the locations of the radio units are static, and specific frequency spectrum may be allocated to a radio unit for the radio unit's static location. The specific frequency spectrum may not be usable at other locations due to interference with other radio units or other licensed or registered spectrum allocations.

By contrast, portable radio-based networks may include radio units with moving locations. In various embodiments, a radio unit may be embodied in a human-wearable backpack or located within a movable vehicle, such as an autonomous land vehicle, an unmanned aerial vehicle (UAV), a bus, a train, a cruise ship, and so forth. In a first scenario, a group of expedition members may be performing a survey in a remote location, and a radio unit in a backpack worn by one of the expedition members may be used to provide connectivity to UE devices of the expedition members so that the expedition members can communicate with one another. In a second scenario, an event may be held at a location without fixed private radio-based network infrastructure, and one or more portable radio units may be used to provide connectivity for security personnel at the event. In a third scenario, a team may be scanning a geographic area for environmental readings, and a portable radio unit may provide connectivity to the team members to gather and/or exchange the environmental readings. In a fourth scenario, a portable radio unit may provide connectivity to a moving convoy of autonomous vehicles. In a fifth scenario, a portable radio unit may provide connectivity to passengers on a moving train, bus, or cruise ship. It will be appreciated that these are just a few of the various scenarios in which a portable radio-based network may be deployed.

Various embodiments of the present disclosure introduce approaches for dynamic spectrum management in portable radio-based networks, or radio-based networks that include portable radio units. Spectrum allocations, such as allocations using the Citizens Broadband Radio Service (CBRS), may be associated with a reference location and a legal tolerance for deviation from the reference location (e.g., 50 meters distance and three meters elevation). As the location of a portable radio unit changes, revised spectrum allocations dynamically adapting to the updated location can be requested from a spectrum allocation service (SAS). In this way, a portable radio unit can switch to the revised spectrum allocation before legal tolerances for the existing spectrum allocation are exceeded.

In some embodiments, revised spectrum allocations may be requested from a spectrum allocation service predictively based at least in part on the direction of movement and velocity of the portable radio unit, or simply to provide spectrum allocations covering adjacent areas in reserve for faster allocation. In some scenarios, a first portable radio unit may exchange a spectrum allocation with a second portable radio unit, without having to release and request the spectrum allocation from a spectrum allocation service. Also, in some cases, a portable radio unit may adapt its operational parameters (e.g., adjusting transmission power, antenna parameters, beamforming) so that its transmit and receive operations remain within legal bounds of the existing spectrum allocation while the location of the portable radio unit changes.

In some embodiments, the radio-based network may utilize CBRS, which refers to 150 megahertz (MHz) of spectrum in the 3550 MHz to 3700 MHz range. The United States Federal Communications Commission (FCC) has set aside this frequency spectrum to enable communication in an otherwise underutilized spectrum block. Three tiers were defined to organize the priority access of the spectrum among various spectrum users: Tier 1 (incumbent), Tier 2 (priority access license), and Tier 3 (general authorized access), in descending priority order. CBRS works with the implicit assumption that CBRS enabled devices (CBSD) are provisioned correctly on a precise location, operate under predefined radio parameters, and remain in exactly the location that the CBSD is provisioned. The location may be determined from a combination of latitude and longitude coordinates, together with height above average terrain (HAAT). A relocated CBSD may violate CBRS constraints. Accordingly, dynamically updating the CBRS spectrum assignment allows for portability of the CBSD.

The radio-based network may use a core network infrastructure that is provisioned dynamically. While the radio-based networks may be provisioned on-demand, the radio-based networks may also be scaled up or down or terminated dynamically, thereby providing organizations with the capability to create an ephemeral radio-based network that may exist during a particular time period or periodically according to a schedule. Further, cell sites may be added to or removed from the radio-based network dynamically on demand. In various scenarios, an organization may create either a private radio-based network for internal use only or a radio-based network open to third-party customers using embodiments of the present disclosure.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QOS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks. Further, the disclosed service can provide application development application programming interfaces (APIs) that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) facilitating portability of radio units that are assigned spectrum allocations; (2) enabling network connectivity in remote areas, areas that lack existing private radio-based network infrastructure, or areas in which the existing radio-based network infrastructure is damaged; (3) enabling coordination among portable radio units to exchange spectrum allocations without delay from contacting a spectrum allocation service to release and reassign spectrum allocations; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IOT), to augmented reality (AR), to virtual reality (VR), to game streaming, to autonomous navigation support for connected vehicles, that previously could not run on a mobile network.

The described "elastic 5G" service provides and manages all of the hardware, software, and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that is deployed and managed according to various embodiments of the present disclosure. The communication network 100 includes a radio-based network (RBN) 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based network 103 may be operated by a cloud service provider for an enterprise, a non-profit, a school system, a governmental entity or other organization. The radio-based network 103 may use private network addresses or public network addresses in various embodiments.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of user equipment (UE) devices 106, which may be mobile devices or fixed location devices. In various examples, the UE devices 106 may include smartphones, connected vehicles, IoT devices, sensors, machinery (such as in a manufacturing facility), hotspots, and other devices. The UE devices 106 are sometimes referred to as customer premises equipment (CPE).

The radio-based network 103 can include capacity provisioned on one or more radio access networks (RANs) that provide the wireless network access to the plurality of UE devices 106 over one or more frequency schemes through a plurality of cells 109. The cells 109 may be fixed or portable. Each of the cells 109 may be equipped with one or more antennas and one or more radio units that send and receive wireless data signals to and from the UE devices 106. The antennas may be configured for one or more frequency bands, and the radio units may also be frequency agile, meaning that the radio units can be dynamically adjusted to change transmit and/or receive modulation frequencies to use different frequency schemes. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with UE devices 106 and provides connection with the radio-based network's core network. Components of the RAN include a radio unit and antennas that cover a given physical area, as well as required core network items for managing connections to the RAN.

The radio-based network 103 may use a plurality of different frequency schemes to communicate with the UE devices 106. Non-limiting examples of frequency schemes may include 2.4 GHz Wi-Fi, television (TV) whitespaces, CBRS, licensed spectrum (e.g., 700 MHz, 600 MHz, 1900 MHZ, 2100 MHZ, etc., for LTE, 5G, or other technologies), and other frequency schemes. A frequency scheme may correspond to a combination of available frequency spectrum, a bandwidth (e.g., channel width), a modulation scheme (e.g., quadrature amplitude modulation (QAM), quadrature phase shift keying (QPSK), orthogonal frequency division multiplexing (OFDM), wideband—code division multiple access (W-CDMA), etc.), a polarization (e.g., horizontal, vertical, circular, etc.), and an output power or signal strength. A frequency scheme may use MIMO with multiple transmitters and receivers in some cases.

In some scenarios, a cell 109 may utilize multiple different frequency schemes to communicate with UE devices 106. In some of these, a cell 109 may use multiple different frequency schemes simultaneously to communicate with a single UE device 106. A cell 109 may switch from one frequency scheme to another over time in order to meet quality-of-service requirements (e.g., modify bandwidth, modify signal strength, etc.) or to reduce cost. Further, as a UE device 106 moves from one cell 109 to another cell 109, the frequency scheme may change.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks, such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN radio units. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the UE devices 106 or the RAN and can handle connection and mobility management tasks. For example, the AMF can manage handovers between radio units in the RAN. In some examples the AMF can be considered as the access point to the 5G core, by terminating certain RAN control plane and UE device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks.

As will be described, a portable radio unit in various embodiments may implement functionality corresponding to the core computing devices 118, the centralized computing devices 115, and the distributed computing devices 112, so that functionality of an entire radio-based network 103 can be implemented in a portable radio unit so that connectivity can be provided to and between UE devices 106 by the portable radio unit, even when a high bandwidth backhaul link is unavailable.

Turning now to FIG. 1B, shown is a block diagram of one example of a portable radio unit 130 according to one or more embodiments. The portable radio unit 130 can be embodied in a human-wearable backpack or a hand-carried case in some scenarios. In various embodiments, a human-wearable backpack has a weight and is sized such that it can be carried on a person's back. The backpack may have straps, such as one or more shoulder straps, to allow it to be worn. As a non-limiting example, the backpack may weigh 20 pounds and have two shoulder straps.

In other scenarios, the portable radio unit 130 may be carried in a vehicle, such as a land vehicle or an aerial vehicle. Components of the portable radio unit 130 may include, for example, one or more antennas 132, one or more radio interfaces 134, one or more distributed unit (DU) network functions 136, one or more centralized unit (CU) network functions 138, one or more core network functions 140, one or more power sources 142, a spectrum management agent 144, a location service 146, a spectrum allocation 148, one or more accelerometers 150, one or more global navigation satellite system (GNSS) devices 152, one or more control plane backhaul links 154, and/or other components.

The antenna 132 is used to send and receive radio-frequency signals to/from the UE devices 106. In some embodiments, the antenna 132 may be adjustable in length or polarization in order to match frequency assignments in the spectrum allocation 148. The antenna 132 may be omnidirectional or directional. For example, the direction and the beamwidth of the antenna 132 may be physically or electronically tuned (e.g., using physical rotation or beamforming) in order to conform with the spectrum allocation 148, optimize signals sent to and received from the UE devices 106, and/or avoid interference with other spectrum allocations 148. Multiple antennas 132 may be used in some embodiments.

The radio interface 134 is used to modulate and/or demodulate radio-frequency signals encoding data sent or received by way of the radio-based network 103. The frequencies employed by the radio interface 134 as well as transmission power and modulation scheme may be determined from the spectrum allocation 148 currently active in the portable radio unit 130.

The DU network functions 136 implement functions of a distributed unit in a 5G or other network, such as the lower layers of the protocol stack, including the radio link control (RLC) layer, the media access control (MAC) layer, and the physical layer. The CU network functions 138 implement functions of a centralized unit in a 5G or other network, such as the service data adaptation protocol (SDAP) layer, the packet data convergence protocol (PDCP) layer, and the radio resource control (RRC) layer. The core network functions 140 may implement core functions in a 5G or other network, such as the AMF, SMF, UPF, and so on. In some embodiments, depending on availability of backhaul bandwidth, the DU network functions 136, the CU network functions 138, and/or the core network functions 140 may be executed in one or more different computing devices remote to the portable radio unit 130.

The power source 142 may include, for example, one or more batteries, one or more solar panels, a generator, power from a power grid, and so forth. In various examples, the power source 142 may be limited in nature such that transmission power and/or other operational parameters of the portable radio unit 130 may be reduced and/or components of the portable radio unit 130 may be disabled or placed in a low power mode in order to reduce power consumption.

The spectrum management agent 144 may be executed in the portable radio unit 130 to dynamically manage the spectrum used by the portable radio unit 130. In this regard, the spectrum management agent 144 may adjust operational parameters as the location of the portable radio unit 130 changes so that the portable radio unit 130 remains within authorized operation of the spectrum allocation 148. Further, the spectrum management agent 144 may request updated spectrum allocations 148 as the location of the portable radio unit 130 changes. Portions of the spectrum management agent 144 may be implemented by components executed on one or more different computing devices remote to the portable radio unit 130 in some embodiments.

The location service 146 is executed to determine a current location of the portable radio unit 130 using signals received by the GNSS devices 152 and/or accelerometer data from one or more accelerometers 150 in combination with a reference location to infer position relative to the reference location. In some implementations, the location service 146 may communicate with one or more other devices at known reference locations and then triangulate the position of the portable radio unit 130 based upon distances estimated from round-trip times to the device(s).

The spectrum allocation 148 corresponds to an authorization for the portable radio unit 130 to operate on a set of frequencies at a reference location and elevation at a particular transmission power. The spectrum allocation 148 may also define modulation type and signal polarization, e.g., horizontal, vertical, or circular. In some examples, the spectrum allocation 148 may define a geographic area in which a signal of a threshold signal strength may be transmitted on a set of frequencies. The spectrum allocation 148 may be valid for a certain period of time. In some scenarios, the portable radio unit 130 may be associated with multiple spectrum allocations 148, and one or more of the multiple spectrum allocations 148 may be inactive.

The accelerometers 150 may be included in the portable radio unit 130 to measure acceleration. For example, three accelerometers 150 may be included in the portable radio unit 130 to measure acceleration along each of the X, Y, and Z axes. The GNSS devices 152 may correspond to Global Positioning System (GPS) devices, GLONASS devices, GALILEO devices, and so on, which are configured to receive signals from reference satellites and determine a current location in terms of latitude, longitude, and elevation.

A control plane backhaul link 154 may be provisioned for the portable radio unit 130 in order to transmit control plane data back to other devices of the radio-based network 103. In one embodiment, the control plane backhaul link 154 may be a relatively low bandwidth link (e.g., a satellite link using the IRIDIUM service) that is used to communicate with a spectrum allocation service in order to request and release spectrum allocations 148. The bandwidth of the control plane backhaul link 154 may be relatively low compared to the bandwidth of the data plane traffic between the UE devices 106 that is processed by the portable radio unit 130.

In various embodiments, the portable radio unit 130 may correspond to a portable device having pluggable hardware modules as described by U.S. patent application Ser. No. 18/067,650, entitled "PORTABLE MOBILE PRIVATE NETWORKS USING PLUGGABLE HARDWARE MODULES," and filed on Dec. 16, 2022, which is incorporated herein by reference in its entirety.

Figure 1C:
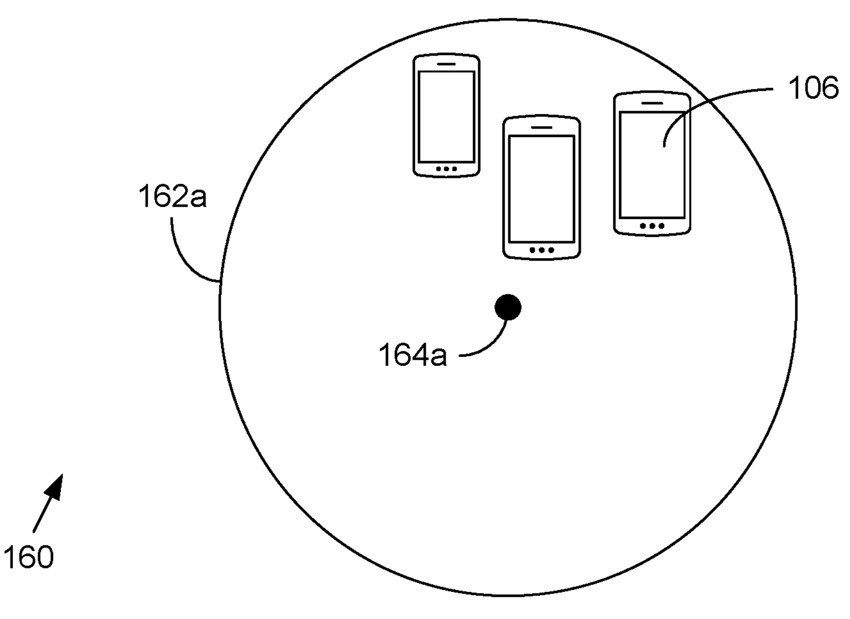
FIG. 1C is a drawing of an example of a geographic area including a coverage area of a portable radio unit according to one or more embodiments of the present disclosure.

Moving on to FIG. 1C, shown is an example of a geographic area 160 including a coverage area 162*a* while a portable radio unit 130 (FIG. 1B) is located at location 164*a*. As shown, a plurality of UE devices 106 are encompassed in the coverage area 162*a*. The portable radio unit 130 may facilitate connectivity to and between the UE devices 106. The location 164*a* is a reference location of the spectrum allocation 148 (FIG. 1B). The coverage area 162*a* may also be a reference coverage area for the spectrum allocation 148.

Figure 1D:
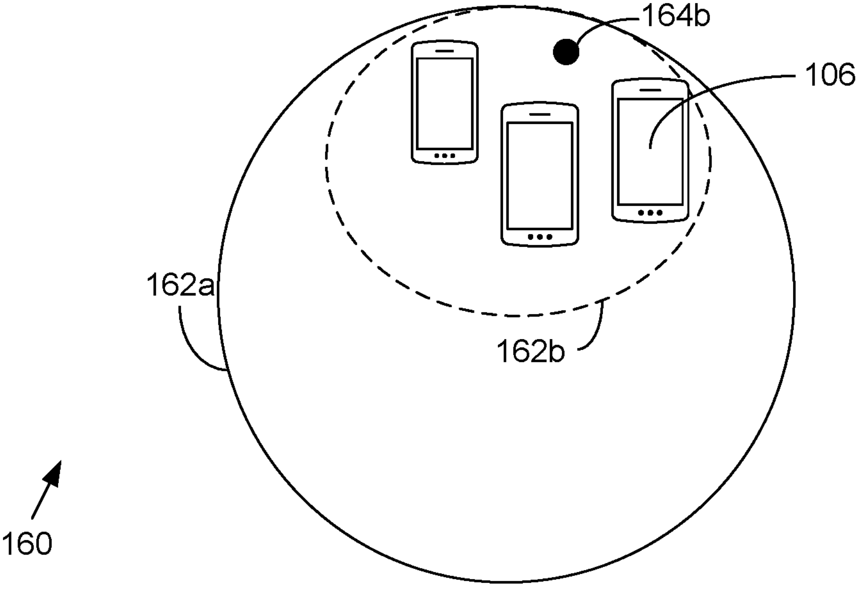
FIG. 1D is a drawing of an example of the geographic area of FIG. 1C including an updated coverage area with a portable radio unit having moved from the first location to a second location according to one or more embodiments of the present disclosure.

FIG. 1D shows an example of the geographic area 160 including an updated coverage area 162*b* with a portable radio unit 130 (FIG. 1B) having moved from the first location 164*a* (FIG. 1C) to a second location 164*b*. With the portable radio unit 130 moving away from the reference location, operational parameters of the portable radio unit 130 (e.g., transmission power, antenna beams) are adjusted to maintain authorized operation within the same spectrum allocation 148 (FIG. 1B). In this example, transmission power may be reduced and the antenna beams directionalized to aim signal toward the UE devices 106 within the boundary of the coverage area 162*a* referenced in the spectrum allocation 148. In this example, the portable radio unit 130 provides sufficient coverage to the UE devices 106 within the authorized bounds of the spectrum allocation 148 despite the portable radio unit 130 moving its location.

Figure 1E:
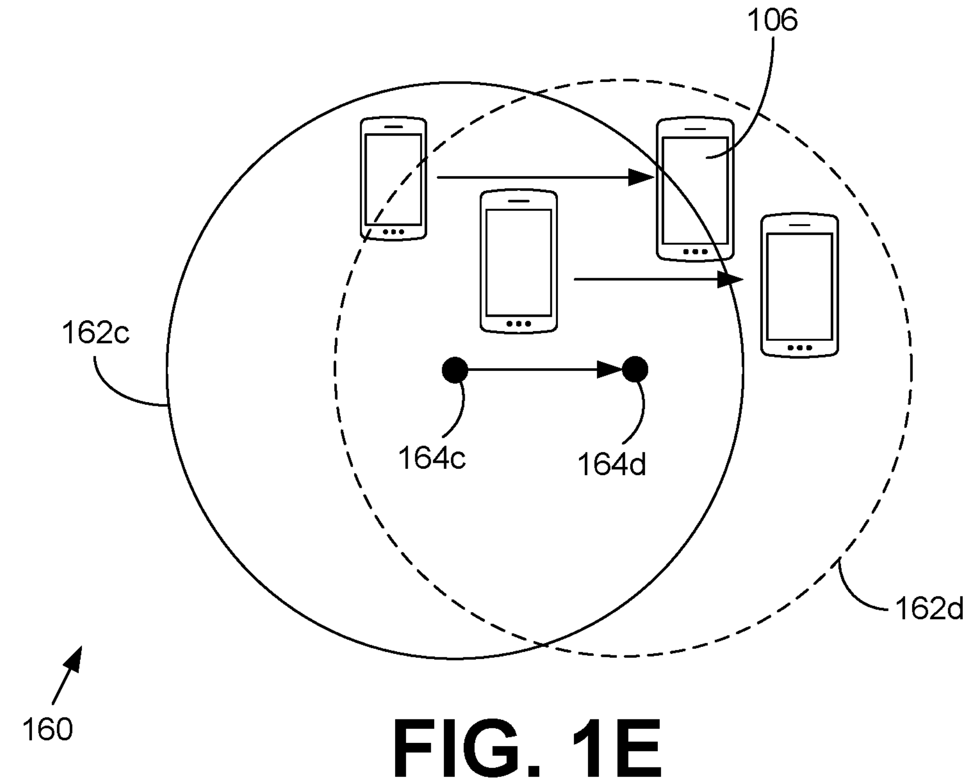
FIG. 1E is a drawing of an example of a geographic area where a portable radio unit moves from a location at a first time to a location at a second time according to one or more embodiments of the present disclosure.

FIG. 1E shows an example of a geographic area 160 where a portable radio unit 130 (FIG. 1B) moves from a location 164*c* at a first time to a location 164*d* at a second time. The UE devices 106 also move their locations similarly. In one scenario, the UE devices 106 and the portable radio unit 130 may be within the same team or convoy moving within the geographic area 160. The portable radio unit 130 may be assigned a first spectrum allocation 148 (FIG. 1B) having a coverage area 162*c* while at the location 164*c*, and a second spectrum allocation 148 having a coverage area 162*d* while at the location 164*d*. Using the frequencies associated with the first spectrum allocation 148 may not be authorized at the location 164*d* due to potential interference with other spectrum allocations 148. For example, the frequencies used may change from the first spectrum allocation 148 to the second spectrum allocation 148 to avoid generating unauthorized interference.

Figure 1F:
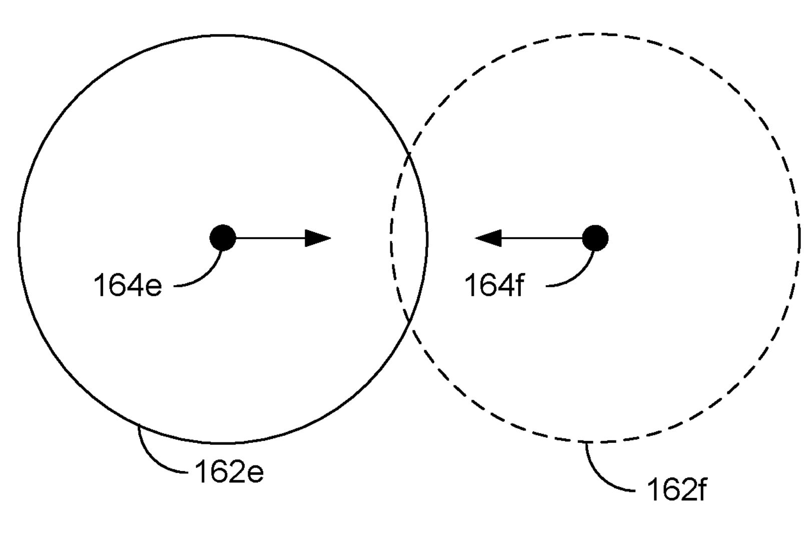
FIGS. 1F and 1G illustrate one example of an exchange of spectrum allocations among two portable radio units in a geographic area according to one or more embodiments of the present disclosure.
Figure 1G:
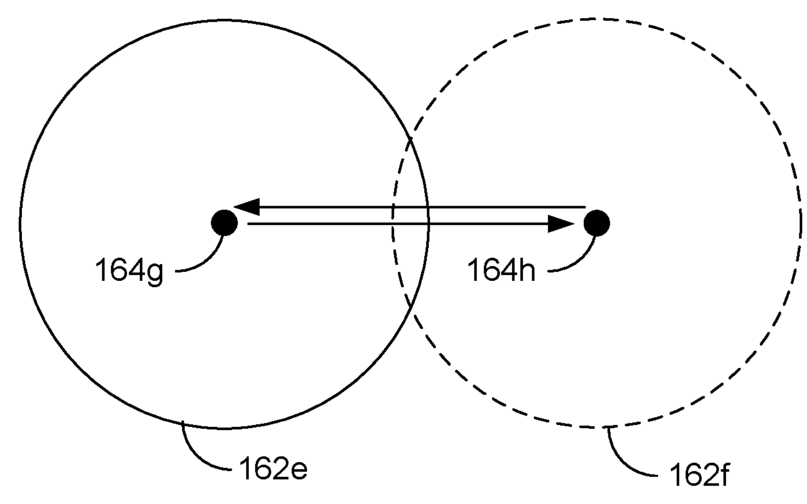
Figure 1G:

FIGS. 1F and 1G illustrate one example of an exchange of spectrum allocations 148 (FIG. 1B) among two portable radio units 130 (FIG. 1B) in a geographic area 160 according to one or more embodiments. In FIG. 1F, at a first time, a first portable radio unit 130 is located at location 164*e* using a first spectrum allocation 148 having a coverage area 162*e*, while a second portable radio unit 130 is located at location 164*f* using a second spectrum allocation 148 having a coverage area 162*f*. In this scenario, the first portable radio unit 130 is moving in the direction of the location 164*f*, and the second portable radio unit 130 is moving in the direction of the location 164*e*.

In FIG. 1G, at a second time, the first portable radio unit 130 has moved to the location 164*h* at or proximate to the previous location 164*f* of the second portable radio unit 130, while the second portable radio unit 130 has moved to the location 164*g* at or proximate to the previous location 164*e* of the first portable radio unit 130. Rather than releasing their old spectrum allocations 148 and requesting new spectrum allocations 148, the first and second portable radio units 130 exchange their spectrum allocations 148 with each other. Consequently, the first portable radio unit 130 is configured to use the second spectrum allocation 148 having the coverage area 162*f*, and the second portable radio unit 130 is configured to use the first spectrum allocation 148 having the coverage area 162*e*. In other examples, in exchanging the spectrum allocations 148, the coverage areas 162 may be different, though within the bounds of authorized operation for the spectrum allocations 148.

Figure 2A:
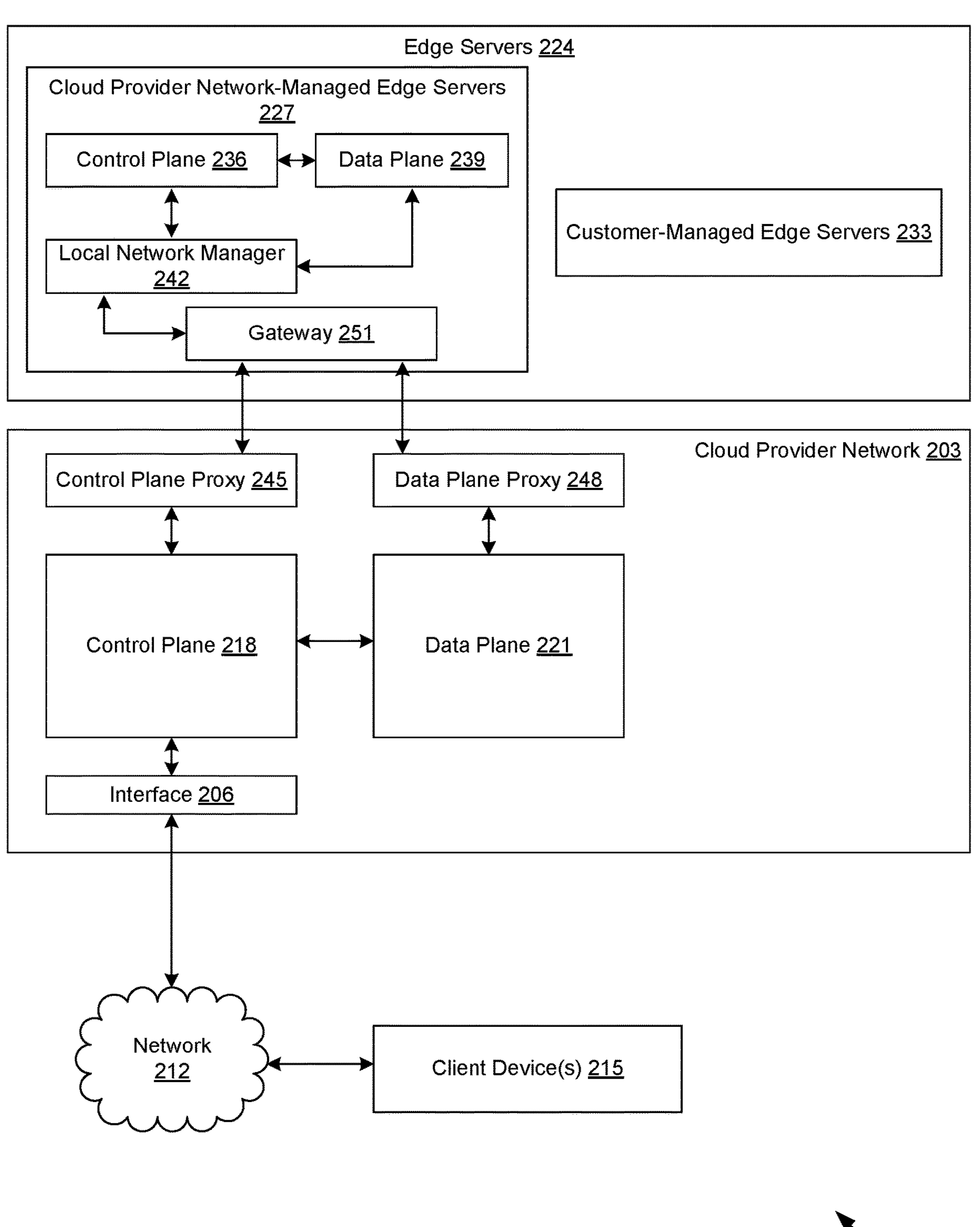
FIG. 2A illustrates an example of a networked environment including a cloud provider network and further including various edge servers of the cloud provider network, which may be used in various locations within the communication network of FIG. 1A, according to some embodiments of the present disclosure.

FIG. 2A illustrates an example of a networked environment 200 including a cloud provider network 203 and further including various edge servers of the cloud provider network 203, which may be used in combination with on-premise customer deployments or portable/mobile customer deployments within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data, as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge server 224 provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, an edge server 224 can be configured to provide capacity for cloud-based workloads to run within the telecommunications network. In some implementations, an edge server 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such edge servers 224 can include cloud provider network-managed edge servers 227 (e.g., formed by servers located separate from those associated with the cloud provider network 203, such as at a customer's premises, in a remote location, or a cell site for a cellular communication network, but where such servers are still managed by the cloud provider), customer-managed edge servers 233 (e.g., formed by servers located on-premise in a customer or partner location), among other possible types of edge servers 224.

As illustrated in the example edge server 224, an edge server 224 can similarly include a logical separation between a control plane 236 and a data plane 239, respectively extending the control plane 218 and data plane 221 of the cloud provider network 203. The edge server 224 may be pre-configured, e.g., by the cloud provider network operator, with an appropriate combination of hardware with software and/or firmware elements to support various types of computing-related resources, and to do so in a manner that mirrors the experience of using the cloud provider network 203. For example, one or more edge server location servers can be provisioned by the cloud provider for deployment within an edge server 224. As described above, the cloud provider network 203 may offer a set of predefined instance types, each having varying types and quantities of underlying hardware resources. Each instance type may also be offered in various sizes. In order to enable customers to continue using the same instance types and sizes in an edge server 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the edge server location servers. This can improve utilization of computing resources within the edge location by allowing for better packing of running instances on servers, and also provides a seamless experience regarding instance usage across the cloud provider network 203 and the cloud provider network-managed edge server 227.

The edge servers 227 can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at an edge server 224 than in the region, an optimal utilization experience may not be provided if the edge server 224 includes such dedicated block store servers. Accordingly, a block storage service may be virtualized in the edge server 224, such that one of the VMs runs the block store software and stores the data of a volume. Similar to the operation of a block storage service in the region of a cloud provider network 203, the volumes within an edge server 224 may be replicated for durability and availability. The volumes may be provisioned within their own isolated virtual network within the edge server 224. The compute instances and any volumes collectively make up a data plane 239 extension of the provider network data plane 221 within the edge server 224.

The servers within an edge server 224 may, in some implementations, host certain local control plane components, for example, components that enable the edge server 224 to continue functioning if there is a break in the connection back to the cloud provider network 203. Examples of these components include a migration manager that can move compute instances between edge server servers if needed to maintain availability, and a key value data store that indicates where volume replicas are located. However, generally the control plane 236 functionality for an edge server 224 will remain in the cloud provider network 203 in order to allow customers to use as much resource capacity of the edge server 224 as possible.

The migration manager may have a centralized coordination component that runs in the region, as well as local controllers that run on the edge server servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer-which should be kept as short as possible. In the presently disclosed migration techniques this can be especially challenging, as resources are being moved between hosts in geographically separate locations which may be connected over one or more intermediate networks 212. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at an edge server 224 may be designed by the cloud provider to run on the cloud provider substrate network, and this software may be enabled to run unmodified in an edge server 224 by using local network manager(s) 242 to create a private replica of the substrate network within the edge location (a "shadow substrate").

The local network manager(s) 242 can run on edge server 224 servers and bridge the shadow substrate with the edge server 224 network, for example, by acting as a virtual private network (VPN) endpoint or endpoints between the edge server 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the edge server 224 to seamlessly communicate with resources in the cloud provider network 203. In some implementations, a single local network manager 242 can perform these actions for all servers hosting compute instances in an edge server 224. In other implementations, each of the server hosting compute instances may have a dedicated local network manager 242. In multi-rack edge locations, inter-rack communications can go through the local network managers 242, with local network managers maintaining open tunnels to one another.

Edge server locations can utilize secure networking tunnels through the edge server 224 network to the cloud provider network 203, for example, to maintain security of customer data when traversing the edge server 224 network and any other intermediate network 212 (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in an edge server 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between an edge server 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of edge server 224. That is, CP proxies 245 provide infrastructure for tunneling management API traffic destined for edge server servers out of the region substrate and to the edge server 224. For example, a virtualized computing service of the cloud provider network 203 can issue a command to a VMM of a server of an edge server 224 to launch a compute instance. A CP proxy 245 maintains a tunnel (e.g., a VPN) to a local network manager 242 of the edge server 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at an edge server 224 or may be able to manage control plane traffic for multiple servers in the same edge server.

A data plane (DP) proxy 248 can also be provisioned in the cloud provider network 203 to represent particular server(s) in an edge server 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span edge servers 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the edge server server(s) and the cloud provider network 203. Data plane traffic flowing between an edge server 224 and the cloud provider network 203 can be passed through DP proxies 248 associated with that edge server 224. For data plane traffic flowing from an edge server 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to an edge server 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using edge server resources in a manner analogous to the way in which such commands would be issued with respect to compute instances hosted within the cloud provider network 203. From the perspective of the customer, the customer can now seamlessly use local resources within an edge server 224 (as well as resources located in the cloud provider network 203, if desired). The compute instances set up on a server at an edge server 224 may communicate both with electronic devices located in the same network, as well as with other resources that are set up in the cloud provider network 203, as desired. A local gateway 251 can be implemented to provide network connectivity between an edge server 224 and a network associated with the cloud provider network 203.

There may be circumstances that necessitate the transfer of data between the object storage service and an edge server 224. For example, the object storage service may store machine images used to launch VMs, as well as snapshots representing point-in-time backups of volumes. The object gateway can be provided on an edge server 224 or a specialized storage device, and provide customers with configurable, per-bucket caching of object storage bucket contents in their edge server 224 to minimize the impact of edge server-region latency on the customer's workloads. The object gateway can also temporarily store snapshot data from snapshots of volumes in the edge server 224 and then sync with the object servers in the region when possible. The object gateway can also store machine images that the customer designates for use within the edge server 224 or on the customer's premises. In some implementations, the data within the edge server 224 may be encrypted with a unique key, and the cloud provider can limit keys from being shared from the region to the edge server 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and an edge server bucket can be created (on the object store servers) to store snapshot data and machine image data using the edge server encryption key.

In the manner described above, an edge server 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones," "edge zones," or "distributed cloud edge zones" (due to being near to customer workloads at the "edge" of the network). An edge zone may be connected in various ways to a publicly accessible network such as the Internet, for example directly, via another network, or via a private connection to a region. Although typically an edge zone would have more limited capacity than a region, in some cases an edge zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication radio units within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1A, the distributed computing devices 112 (FIG. 1A), the centralized computing devices 115 (FIG. 1A), and the core computing devices 118 (FIG. 1A) may be implemented as edge servers 224 of the cloud provider network 203. In the example, of FIG. 1B, the portable radio unit 130 (FIG. 1B) may be implemented as an edge server 224 of the cloud provider network 203. The installation or siting of edge servers 224 within a communication network 100 can vary subject to the particular network topology or architecture of the communication network 100. Edge servers 224 can generally be connected anywhere the communication network 100 can break out packet-based traffic (e.g., IP based traffic). Additionally, communications between a given edge server 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between an edge server 224 and the cloud provider network 203 can be broken out of the communication network 100 without routing through the core network.

In some embodiments, edge servers 224 can be connected to more than one communication network associated with respective customers. For example, when two communication networks of respective customers share or route traffic through a common point, an edge server 224 can be connected to both networks. For example, each customer can assign some portion of its network address space to the edge server 224, and the edge server 224 can include a router or gateway 251 that can distinguish traffic exchanged with each of the communication networks 100. For example, traffic destined for the edge server 224 from one network might have a different destination IP address, source IP address, and/or virtual local area network (VLAN) tag than traffic received from another network. Traffic originating from the edge server 224 to a destination on one of the networks can be similarly encapsulated to have the appropriate VLAN tag, source IP address (e.g., from the pool allocated to the edge server 224 from the destination network address space) and destination IP address.

Figure 2B:
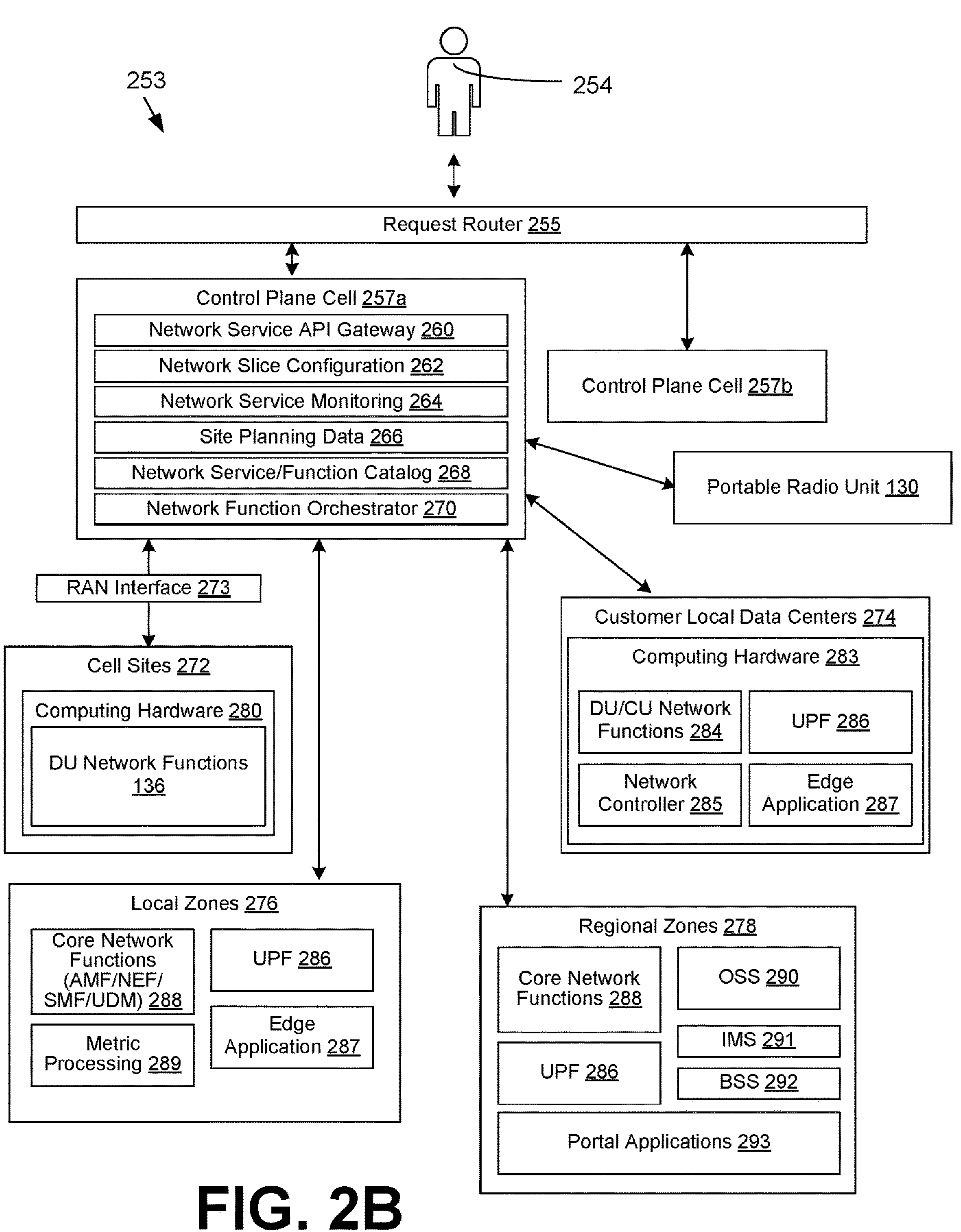
FIG. 2B depicts an example of cellularization and geographic distribution of the communication network of FIG. 1A according to some embodiments of the present disclosure.

FIG. 2B depicts an example 253 of cellularization and geographic distribution of the communication network 100 (FIG. 1A). In FIG. 2B, a user device 254 communicates with a request router 255 to route a request to one of a plurality of control plane cells 257*a* and 257*b*. Each control plane cell 257 may include a network service API gateway 260, a network slice configuration 262, a function for network service monitoring 264, site planning data 266 (including layout, device type, device quantities, etc., that describe a customer's site requirements), a network service/function catalog 268, a network function orchestrator 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1A).

The control plane cell 257 may be in communication with one or more cell sites 272 by way of a RAN interface 273, one or more customer local data centers 274, one or more local zones 276, one or more regional zones 278, and one or more portable radio units 130. The RAN interface 273 may include an application programming interface (API) that facilitates provisioning or releasing capacity in a RAN operated by a third-party communication service provider at a cell site 272. The cell sites 272 include computing hardware 280 that executes one or more distributed unit (DU) network functions 136. The customer local data centers 274 include computing hardware 283 (e.g., an edge server 224) that execute one or more DU or central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287. In some implementations, such core network functions may be run on an edge server 224 which is more local to the edge server 224 running the DU/CU network functions 284, for example the same edge server 224 or another edge server 224 collocated at the same facility.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
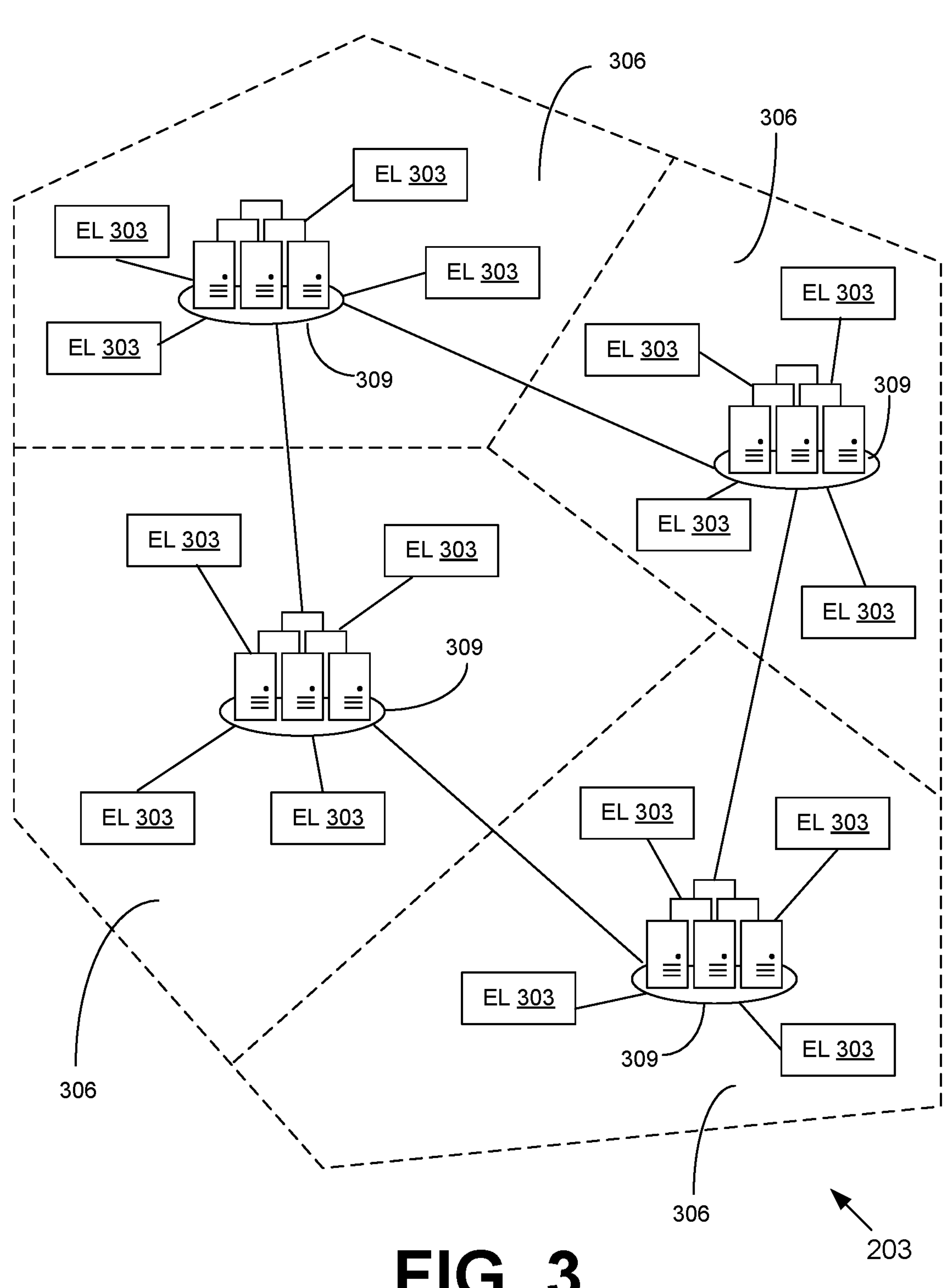
FIG. 3 illustrates an example of the networked environment of FIG. 2A including geographically dispersed edge servers according to some embodiments of the present disclosure.

FIG. 3 illustrates an exemplary cloud provider network 203 including geographically dispersed edge servers 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
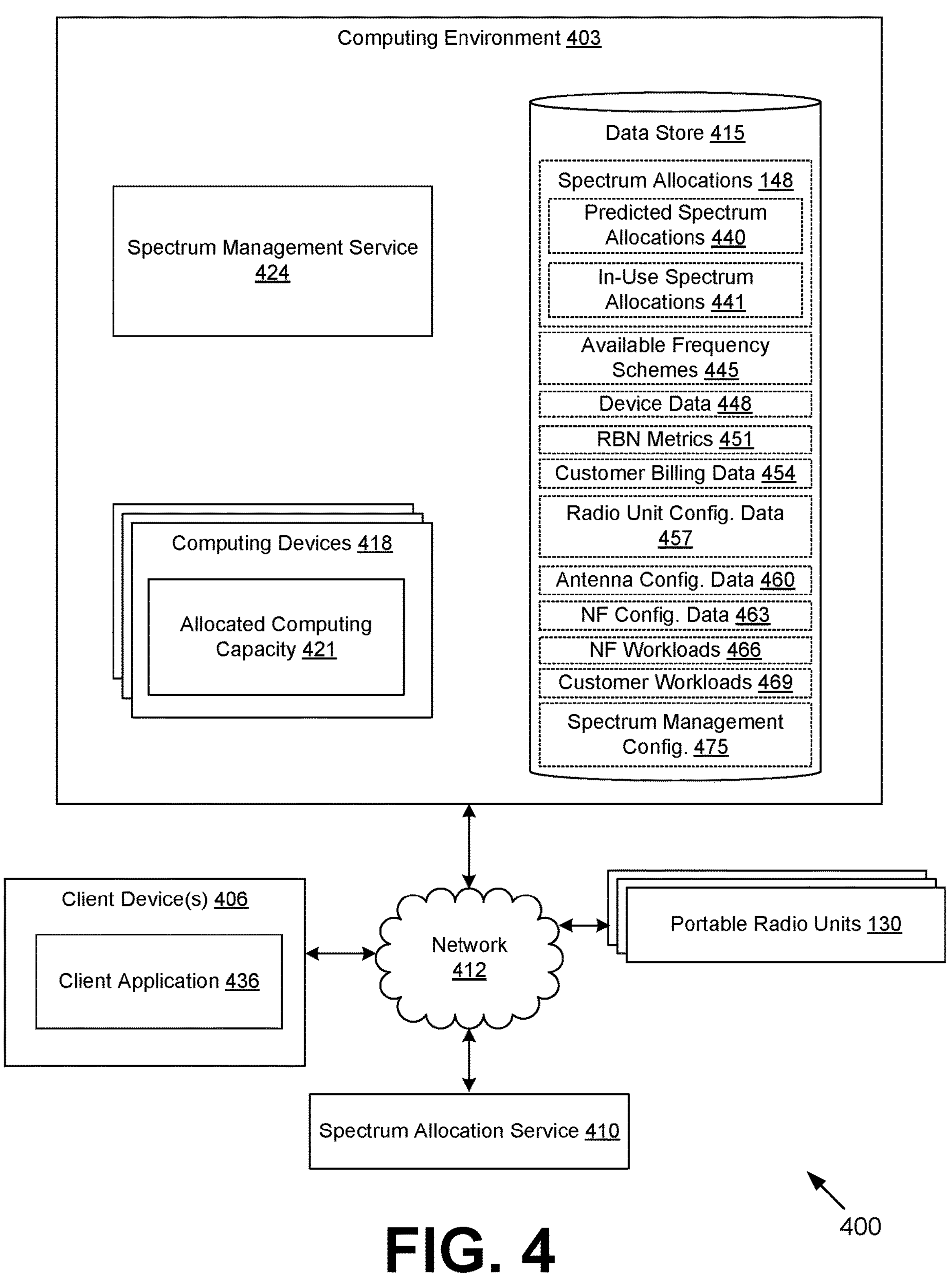
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more radio access networks (RANs) 409, a spectrum allocation service 410, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks. The RANs 409 may be operated by a plurality of different communication service providers. In some cases, one or more of the RANs 409 may be operated by a cloud provider network 203 (FIG. 2A) or a customer of the cloud provider network 203.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as ×86, ×86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUS), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a spectrum management service 424 and other applications, services, processes, systems, engines, or functionality not discussed in detail herein. The spectrum management service 424 may be employed to obtain spectrum allocations 148 from the spectrum allocation service 410 for portable radio units 130, either predictively in advance of completed movement of the portable radio units 130 or in response to the portable radio units 130 moving to updated locations. The spectrum management service 424 may then assign the spectrum allocations 148 to the portable radio units 130 and/or configure the portable radio units 130 to use the spectrum allocations 148.

The data stored in the data store 415 includes, for example, one or more spectrum allocations 148, including one or more predicted spectrum allocations 440 and one or more in-use spectrum allocations 441, one or more available frequency schemes 445, device data 448, one or more RBN metrics 451, customer billing data 454, radio unit configuration data 457, antenna configuration data 460, network function configuration data 463, one or more network function workloads 466, one or more customer workloads 469, spectrum management configuration 475, and potentially other data.

The predicted spectrum allocations 440 correspond to spectrum allocations 148 that are predictively requested and obtained from the spectrum allocation service 410. In one example, the spectrum management service 424 may request spectrum allocations 148 for some or all areas adjacent to a current coverage area for a portable radio unit 130. In another example, the spectrum management service 424 may request spectrum allocations 148 along a current direction of movement of the portable radio unit 130, potentially based at least in part on a velocity of the portable radio unit 130. In another example, the spectrum management service 424 may request spectrum allocations 148 along a preplanned route (e.g., a train route, a bus route, etc.). The in-use spectrum allocations 441 correspond to spectrum allocations 148 that are currently in use by portable radio units 130 and cannot be assigned to another portable radio unit 130 until released.

The available frequency schemes 445 include frequency schemes with frequency spectrum that is available to be allocated for radio-based networks 103, as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on. The available frequency schemes 445 may be associated with maximum bandwidths or bitrates for each geographic subarea. The available frequency schemes 445 may depend on those that are permissible by a government in a particular area.

The device data 448 corresponds to data describing UE devices 106 that are permitted to connect to the radio-based network 103. This device data 448 includes corresponding users, account information, billing information, data plans, permitted applications or uses, an indication of whether the UE device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on. The device data 448 may indicate which frequency schemes are supported by a particular UE device 106. In some cases, multiple frequency schemes may be supported for simultaneous use. In order to support the various frequency schemes, the UE device 106 may have specialized hardware, including radio-frequency encoders and decoders and antennas. In various cases, the UE devices 106 may be frequency agile to some degree in order to support a frequency scheme.

The RBN metrics 451 include various metrics or statistics that indicate the performance or health of the radio-based network 103. Such RBN metrics 451 may include bandwidth metrics, dropped packet metrics, signal strength metrics, latency metrics, and so on. The RBN metrics 451 may be aggregated on a per-device basis, a per-cell basis, a per-customer basis, etc. The RBN metrics 451 may be used to ascertain real-world interference in geographic subareas for various frequency schemes.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware. The customer billing data 454 may include bids or priorities assigned by the customer for certain QoS characteristics, or corresponding frequency schemes, indicating what the customer's demand, or what the customer is willing to pay, for the frequency schemes.

The radio unit configuration data 457 may correspond to operational parameters for radio units deployed in radio-based networks 103, such as the portable radio units 130. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103. In various embodiments, the network functions may be deployed in VM instances or containers located in computing devices 418 that are in or co-located at a portable radio unit 130, at cell sites, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The customer workloads 469 correspond to machine images, containers, or functions of the customer that may be executed alongside or in place of the network function workloads 466 in the allocated computing capacity 421 or in an edge server 224 (FIG. 2A) at or co-located with the portable radio unit 130. For example, the customer workloads 469 may provide or support a customer application or service. In various examples, the customer workloads 469 relate to factory automation, autonomous robotics, augmented reality, virtual reality, design, surveillance, and so on.

The spectrum management configuration 475 corresponds to configuration parameters and settings that may control the operation of the spectrum management service 424 or the corresponding spectrum management agents 144 (FIG. 1B) on the respective portable radio units 130. For example, the spectrum management configuration 475 may specify a maximum permissible distance or elevation change of a portable radio unit 130 away from a reference location of a spectrum allocation 148, which would cause an updated spectrum allocation 148 to be assigned or would cause a change in operational parameters for the portable radio unit 130. The spectrum management configuration 475 may also include parameters that control the exchange of spectrum allocations 148 among portable radio units 130.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum allocation service 410 provides reservations of frequency spectrum for customers' use in RANs 409. In one scenario, the spectrum allocation service 410 is operated by an entity, such as a third party, to manage reservations and coexistence in publicly accessible spectrum. One example of such spectrum may be the Citizens Broadband Radio Service (CBRS). With CBRS, both licensed and unlicensed use in the United States requires a commercial agreement with a certified Spectrum Access System (SAS) provider. The SAS authorizes registered access points, or radio units, to operate on 10 MHz blocks of spectrum and to manage interference in the CBRS band. SAS providers assign these spectrum blocks under a three-tiered structured with varying degrees of priority ranked from lowest to highest. Unlicensed use is at the lowest priority tier, licensed users are protected from the unlicensed user operations, and incumbent users such as the Armed Services are protected from both. The SAS providers can manage the lower tier users to avoid interference, either reassigning them to other spectrum blocks or shutting down their operations until another spectrum block becomes available. In another scenario, the spectrum allocation service 410 is operated by a telecommunications service provider in order to sell or sublicense portions of spectrum owned or licensed by the provider.

Figure 5:
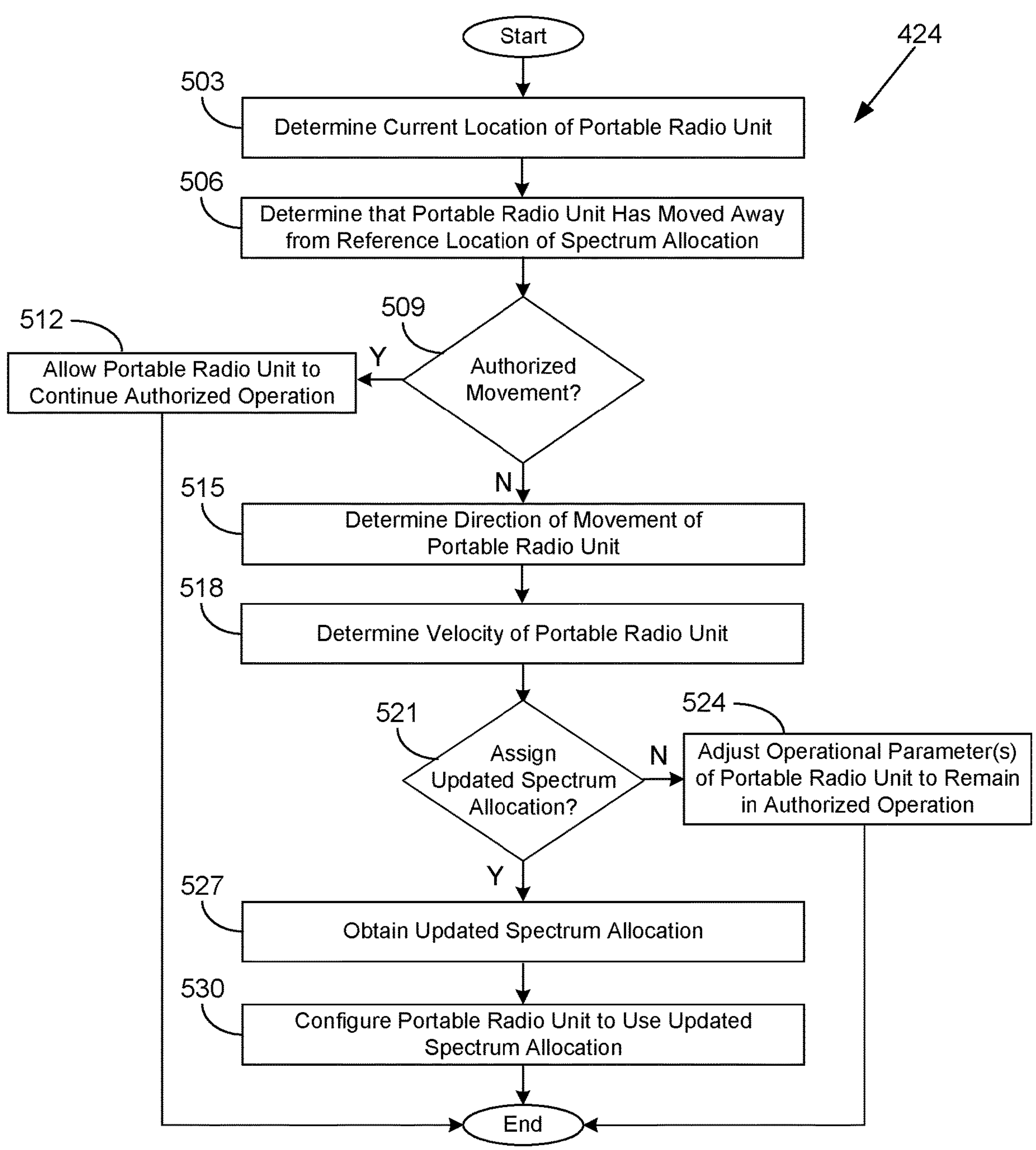
FIG. 5 is a flowchart illustrating an example of functionality implemented as portions of a spectrum management service executed in a computing environment in the networked environment of FIG. 4 according to various embodiments of the present disclosure.

Referring next to FIG. 5, shown is a flowchart that provides one example of the operation of a portion of the spectrum management service 424 according to various embodiments. It is understood that the flowchart of FIG. 5 provides merely an example of the many different types of functional arrangements that may be employed to implement the operation of the portion of the spectrum management service 424 as described herein. As an alternative, the flowchart of FIG. 5 may be viewed as depicting an example of elements of a method implemented in the computing environment 403 (FIG. 4) or the portable radio unit 130 (FIG. 1B) according to one or more embodiments. In some embodiments, steps of the flowchart of FIG. 5 may be performed by a spectrum management agent 144 (FIG. 1B) executed in the portable radio unit 130.

Beginning with box 503, the spectrum management service 424 determines a current location of a portable radio unit 130. For example, the location service 146 (FIG. 1B) of the portable radio unit 130 may determine the current location using a GNSS device 152 (FIG. 1B), accelerometer data from one or more accelerometers 150 (FIG. 1B) in the portable radio unit 130 indicating a movement away from a reference location, or via triangulation based upon round-trip times between the portable radio unit 130 and one or more other devices with known locations. The location service 146 may report the current location to the spectrum management service 424.

In box 506, the spectrum management service 424 determines based at least in part on the current location that the portable radio unit 130 has moved away from, or is moving away from, the reference location of the spectrum allocation 148 that is currently in use by the portable radio unit 130. For example, the spectrum management service 424 may determine that the current location is different from the reference location by at least a threshold distance or elevation difference.

In box 509, the spectrum management service 424 determines whether the movement of the portable radio unit 130 is authorized and at least greater than a threshold distance from an authorized limit or boundary. For example, a movement of up to 50 meters distance or three meters elevation may be permissible under the spectrum allocation 148. If the movement is authorized, in box 512, the spectrum management service 424 allows the portable radio unit 130 to continue authorized operation using the existing spectrum allocation 148. In some cases, the spectrum management service 424 may predictively request and reserve additional spectrum allocations 148 from a spectrum allocation service 410 (FIG. 4) based at least in part on the movement between the reference location and the current location. For example, a machine learning model may be developed and trained to determine based upon known parameters (e.g., movement distance, velocity, user history) where the portable radio unit 130 is likely going, and therefore which spectrum allocation 148 it will likely need based upon the likely path. Thereafter, the operation of the portion of the spectrum management service 424 ends.

If the movement results in unauthorized operation or results in a current location that is within the threshold distance of the authorized limit or boundary, the spectrum management service 424 instead moves from box 509 to box 515. In box 515, the spectrum management service 424 determines a direction of movement of the portable radio unit 130 based at least in part on comparing the reference location to the current location. In box 518, the spectrum management service 424 determines a velocity of the portable radio unit 130 based at least in part on a time taken to move from the reference location to the current location. For example, the spectrum management service 424 may determine a predicted future location of the portable radio unit 130 based at least in part on the current location, the direction of movement, and/or the velocity, and this predicted future location may drive the assignment of an updated spectrum allocation 148 if needed. In some implementations, a machine learning model is developed and trained to predict future locations of the portable radio unit 130 based upon movement, velocity, and/or history.

In box 521, the spectrum management service 424 determines whether to assign an updated spectrum allocation 148 to the portable radio unit 130 in order to maintain authorized operation. This determination may be made based on the direction of movement along with the velocity. For example, the portable radio unit 130 may be moving at a velocity that would soon place it at a future location at which a different spectrum allocation 148 is required. If the velocity is relatively low or zero, the operation of the portable radio unit 130 may be reconfigured to remain within authorized bounds of the existing spectrum allocation 148. The determination may also take into account whether an adjustment to operation would enable UE devices 106 (FIG. 1A) to continue to receive connectivity from the portable radio unit 130 based on the respective current locations of the UE devices 106. A machine learning model may also be trained to predict changes to the locations of the UE devices 106, and the predicted changes may be a factor in assigning a spectrum allocation 148. For example, if the UE devices 106 are predicted to move to a certain area, the spectrum allocation 148 should be requested to cover the area of predicted movement.

If the spectrum management service 424 determines that an updated spectrum allocation 148 is not needed, the spectrum management service 424 moves from box 521 to box 524 and adjusts one or more operational parameters of the portable radio unit 130 in order to maintain authorized operation. Such parameters may include the transmission power, an antenna parameter, a beamforming parameter, and so forth. For example, the spectrum management service 424 may cause the transmission power of the portable radio unit 130 to be reduced or the antenna direction and/or beamwidth of the portable radio unit 130 to be altered to remain within existing spectrum allocation 148. In some scenarios, the operational parameters are adjusted so that the coverage area of the portable radio unit 130 remains within an authorized coverage area of the existing spectrum allocation 148. Thereafter, the operation of the portion of the spectrum management service 424 ends.

If the spectrum management service 424 instead determines in box 521 to assign an updated spectrum allocation 148, the spectrum management service 424 continues to box 527. In box 527, the spectrum management service 424 obtains an updated spectrum allocation 148 from a spectrum allocation service 410 or from a set of existing spectrum allocations 148 (such as predicted spectrum allocations 440 (FIG. 4)) that are not currently in use. One or more other spectrum allocations 148 in the direction of travel may be determined, and the updated spectrum allocation 148 may be selected to avoid conflict (e.g., legally prohibited or potentially interfering overlap of signals) with the other spectrum allocations 148. In some cases, the spectrum management service 424 may facilitate an exchange of spectrum allocations 148 between two portable radio units 130 (e.g., implementing different cells 109 (FIG. 1A) of a radio-based network 103 or associated with a different radio-based network 103) that cross or overlap movement paths. The updated spectrum allocation 148 may be selected in order to maintain coverage for UE devices 106 being served by the portable radio unit 130 based at least in part on the respective locations of the UE devices 106. In some cases, the updated spectrum allocation 148 may be obtained from a different spectrum allocation service 410 than the existing or previous spectrum allocation 148 based upon the coverage area moving to a different jurisdiction or based on availability. In some situations, the spectrum management service 424 may determine to configure the portable radio unit 130 to use unlicensed spectrum based upon cost of licensed/allocatable spectrum, low levels of interference on the unlicensed spectrum in the coverage area, and/or lack of availability of spectrum from the spectrum allocation service 410.

In box 530, the spectrum management service 424 configures the portable radio unit 130 to use the updated spectrum allocation 148. This may cause the portable radio unit 130 to change frequencies and/or other parameters. If the portable radio unit 130 is not currently at the reference location for the updated spectrum allocation 148, operation under the updated spectrum allocation 148 may be adjusted to remain within authorized limits, as in box 524.

The portable radio unit 130 subsequently facilitates communication between a plurality of UE devices 106 using the updated spectrum allocation 148. When the portable radio unit 130 changes frequencies or otherwise adjusts to the updated spectrum allocation 148, connectivity to the UE devices 106 may temporarily be dropped, and the UE devices 106 may be configured to scan authorized frequencies to rediscover the portable radio unit 130 and reestablish connectivity. The spectrum management service 424 may be configured to release the previous spectrum allocation 148 or to hold it in reserve as a potential future spectrum allocation 148 for the same portable radio unit 130 or a different portable radio unit 130. Thereafter, the operation of the portion of the spectrum management service 424 ends.

Figure 6:
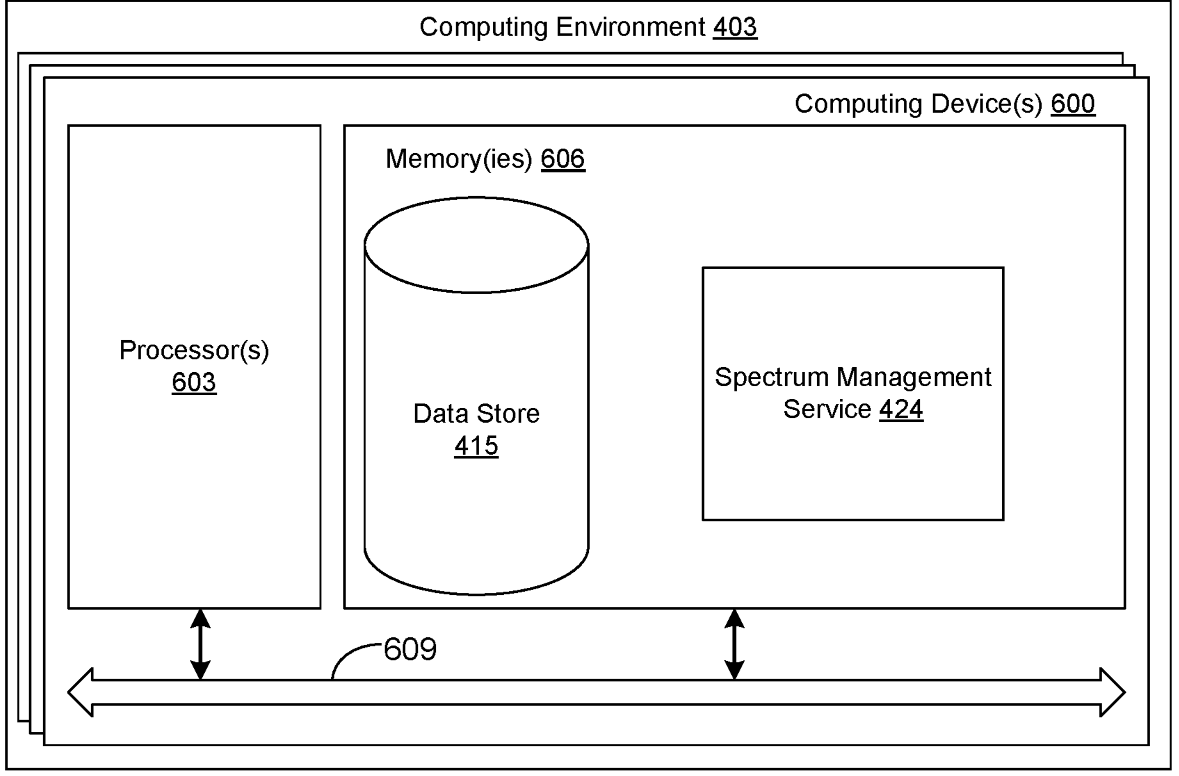
FIG. 6 is a schematic block diagram that provides one example illustration of a computing environment employed in the networked environment of FIG. 4 according to various embodiments of the present disclosure.

With reference to FIG. 6, shown is a schematic block diagram of the computing environment 403 according to an embodiment of the present disclosure. The computing environment 403 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the spectrum management service 424 and potentially other applications. Also stored in the memory 606 may be a data store 415 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the spectrum management service 424 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the spectrum management service 424. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the spectrum management service 424, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the spectrum management service 424, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 403.

Unless otherwise explicitly stated, articles such as "a" or "an," and the term "set," should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
- a radio-based network comprising a portable radio unit providing connectivity to a plurality of user equipment (UE) devices; and
- a computing device configured to at least:
  - configure the portable radio unit to use a first spectrum allocation to provide the connectivity to the plurality of UE devices, the first spectrum allocation being associated with a reference location for the portable radio unit;
  - receive a current location of the portable radio unit;
  - determine a predicted future location of the portable radio unit based at least in part on the current location of the portable radio unit;
  - request a second spectrum allocation associated with the predicted future location of the portable radio unit from a spectrum allocation service; and
  - configure the portable radio unit to use the second spectrum allocation instead of the first spectrum allocation to provide the connectivity to the plurality of UE devices.

2. The system of claim 1, wherein the predicted future location is determined based at least in part on a velocity of the portable radio unit and a direction of movement of the portable radio unit.

3. The system of claim 1, wherein the portable radio unit is embodied in a human-wearable backpack comprising the computing device.

4. The system of claim 1, wherein the portable radio unit has a satellite backhaul link for control plane traffic.

5. The system of claim 1, wherein the computing device is further configured to at least:
- determine that the current location differs from the reference location; and
- adjust an operational parameter of the portable radio unit to maintain authorized operation within the first spectrum allocation, the operational parameter comprising at least one of: a transmission power, an antenna parameter, or a beamforming parameter.

6. The system of claim 1, wherein the portable radio unit is configured to perform one or more core network functions, one or more distributed unit functions, and one or more centralized unit functions for the radio-based network.

7. The system of claim 1, wherein the current location is determined based at least in part on accelerometer data from the portable radio unit.

8. A computer-implemented method, comprising:

determining that a portable radio unit implementing a cell of a radio-based network has moved away from a reference location associated with a first spectrum allocation used by the portable radio unit;

obtaining a second spectrum allocation for the portable radio unit based at least in part on a direction of movement of the portable radio unit, wherein obtaining the second spectrum allocation comprises:

determining other spectrum allocations in the direction of movement of the portable radio unit; and selecting the second spectrum allocation so as to avoid conflict with the other spectrum allocations; and configuring the portable radio unit to use the second spectrum allocation instead of the first spectrum allocation.

9. The computer-implemented method of claim 8, further comprising, before configuring the portable radio unit to use the second spectrum allocation instead of the first spectrum allocation, adjusting an operational parameter of the portable radio unit to maintain authorized operation within the first spectrum allocation after moving away from the reference location, the operational parameter comprising at least one of: a transmission power, an antenna parameter, or a beamforming parameter.

10. The computer-implemented method of claim 8, wherein configuring the portable radio unit to use the second spectrum allocation is performed in response to determining that a current location of the portable radio unit is at least a threshold distance from the reference location.

11. The computer-implemented method of claim 8, wherein obtaining the second spectrum allocation further comprises requesting the second spectrum allocation from a spectrum allocation service.

12. The computer-implemented method of claim 8, wherein obtaining the second spectrum allocation further comprises predictively requesting a plurality of spectrum allocations adjacent to the first spectrum allocation from a spectrum allocation service, the plurality of spectrum allocations including the second spectrum allocation.

13. The computer-implemented method of claim 8, wherein obtaining the second spectrum allocation further comprises exchanging the first spectrum allocation for the second spectrum allocation provided by another portable radio unit implementing another cell of the radio-based network.

14. The computer-implemented method of claim 8, wherein obtaining the second spectrum allocation for the portable radio unit is further based at least in part on a velocity of the portable radio unit.

15. A computer-implemented method, comprising:

determining that a portable radio unit implementing a cell of a radio-based network is moving away from a reference location associated with a spectrum allocation used by the portable radio unit;

adjusting an operational parameter of the portable radio unit to maintain authorized operation within the spectrum allocation in response to the portable radio unit moving away from the reference location;

determining that a further adjustment of the operational parameter would not maintain the authorized operation within the spectrum allocation;

obtaining an updated spectrum allocation for the portable radio unit based at least in part on an updated location of the portable radio unit; and configuring the portable radio unit to use the updated spectrum allocation instead of the spectrum allocation.

16. The computer-implemented method of claim 15, wherein adjusting the operational parameter further comprises reducing a transmission power used by the portable radio unit so that a coverage area of the portable radio unit remains within an authorized coverage area associated with the spectrum allocation.

17. The computer-implemented method of claim 15, wherein adjusting the operational parameter further comprises adjusting a beamforming parameter so that a coverage area of the portable radio unit remains within an authorized coverage area associated with the spectrum allocation.

18. The computer-implemented method of claim 15, wherein adjusting the operational parameter further comprises adjusting an antenna parameter so that a coverage area of the portable radio unit remains within an authorized coverage area associated with the spectrum allocation.

* * * * *